United States Patent [19]

Pimpis

[11] Patent Number: 5,127,307
[45] Date of Patent: Jul. 7, 1992

[54] METHOD OF MANUFACTURE OF ARTICLES EMPLOYING TUBULAR BRAIDS AND RESIN APPLICATOR USED THEREIN

[75] Inventor: Robert M. Pimpis, Dover, N.H.

[73] Assignee: Gould Inc., Eastlake, Ohio

[21] Appl. No.: 510,458

[22] Filed: Apr. 17, 1990

Related U.S. Application Data

[63] Continuation-in-part of Ser. No. 413,453, Sep. 27, 1989, Pat. No. 4,947,149.

[51] Int. Cl.$^5$ ............................................. D04C 3/48
[52] U.S. Cl. .................................... 87/23; 118/234; 156/149; 156/172; 156/425; 156/428
[58] Field of Search ............... 87/1, 6, 7, 9, 23, 29, 87/30; 57/7, 295, 296, 297; 156/148, 149, 172, 187, 425, 428, 432; 118/229, 234, 420, DIG. 22

[56] References Cited

U.S. PATENT DOCUMENTS

| | | |
|---|---|---|
| 13,568 | 5/1913 | Cobb . |
| 1,098,257 | 5/1914 | Healey, Jr. et al. . |
| 1,110,671 | 9/1914 | Cobb . |
| 1,895,022 | 1/1933 | Chandler . |
| 1,993,110 | 3/1935 | Myers ............................. 57/295 |
| 2,025,038 | 12/1935 | Cannon . |
| 2,298,748 | 10/1942 | Brown . |
| 2,308,825 | 1/1943 | Rawlings ............................. 87/1 |
| 2,344,181 | 4/1944 | Stone . |
| 2,870,295 | 1/1959 | Haroldsen et al. . |
| 3,007,497 | 11/1961 | Shobert . |
| 3,033,729 | 5/1962 | Shobert . |
| 3,038,523 | 6/1962 | Merck et al. ............... 156/149 X |
| 3,111,567 | 11/1963 | Stewart . |
| 3,240,905 | 4/1964 | Kozacka . |
| 3,424,204 | 1/1969 | Sato . |
| 3,653,295 | 4/1972 | Pintard . |
| 3,979,709 | 9/1976 | Healey, Jr. . |
| 3,983,525 | 9/1976 | Healey, Jr. . |
| 3,984,800 | 10/1976 | Healey, Jr. . |
| 4,064,684 | 12/1977 | Nijhuis ............................ 57/297 X |
| 4,104,604 | 8/1978 | George . |
| 4,124,836 | 11/1978 | Wilks . |
| 4,215,331 | 7/1980 | Kozacka . |
| 4,216,457 | 8/1980 | Panaro . |
| 4,300,281 | 11/1981 | Panaro . |
| 4,309,865 | 1/1982 | Brunsch ............................ 57/7 X |
| 4,349,803 | 9/1982 | Tobin . |
| 4,373,555 | 2/1983 | Mattuck et al. . |
| 4,373,556 | 2/1983 | Bergh . |
| 4,494,436 | 1/1985 | Kruesi . |
| 4,615,168 | 10/1986 | Oestreich .................... 156/172 X |
| 4,713,645 | 12/1987 | Razaui . |
| 4,808,963 | 2/1989 | Stunzi . |

*Primary Examiner*—Joseph J. Hail, III
*Attorney, Agent, or Firm*—Fish & Richardson

[57] ABSTRACT

An applicator for applying resin to fibers being braided in a tubular shape (e.g., in the manufacture of a fuse casing), the applicator having a wiping surface on which the fibers wipe as they travel to a mandrel on which they are braided, the wiping surface being defined by a surface of revolution around the mandrel and having a continuous orifice for supplying resin continuously around the wiping surface. Also disclosed is an electrical fuse including a fuse casing having a tubular wall including multiple-filament reinforcing yarns that have been braided in the tubular shape of the wall and a synthetic resin bonding the yarns together and impregnating the yarns, a pair of terminals secured to the ends of the fuse casing, and a fusible element inside the casing and connected to the terminals.

20 Claims, 3 Drawing Sheets

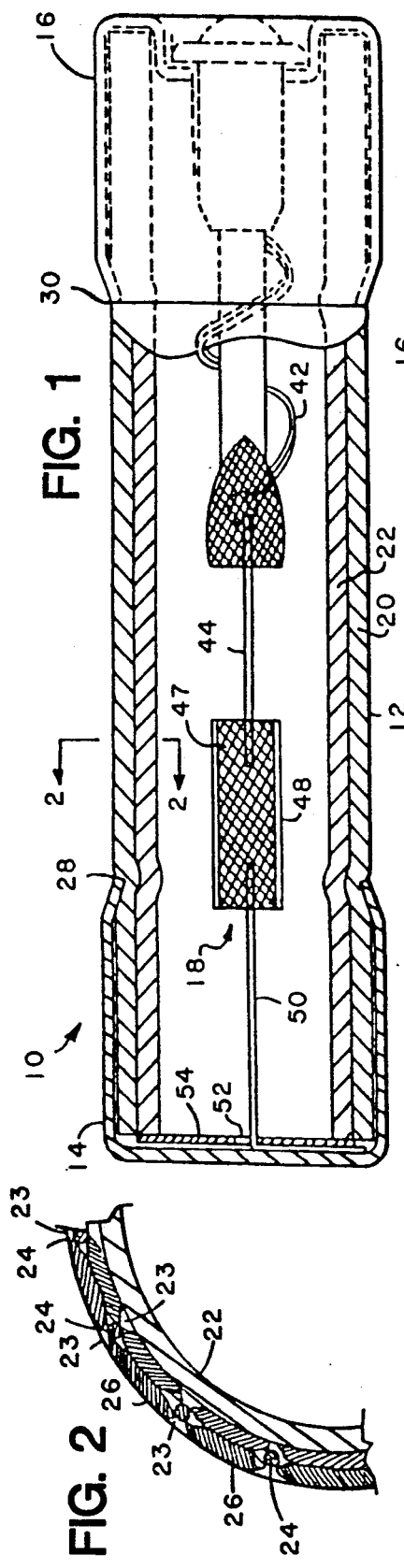
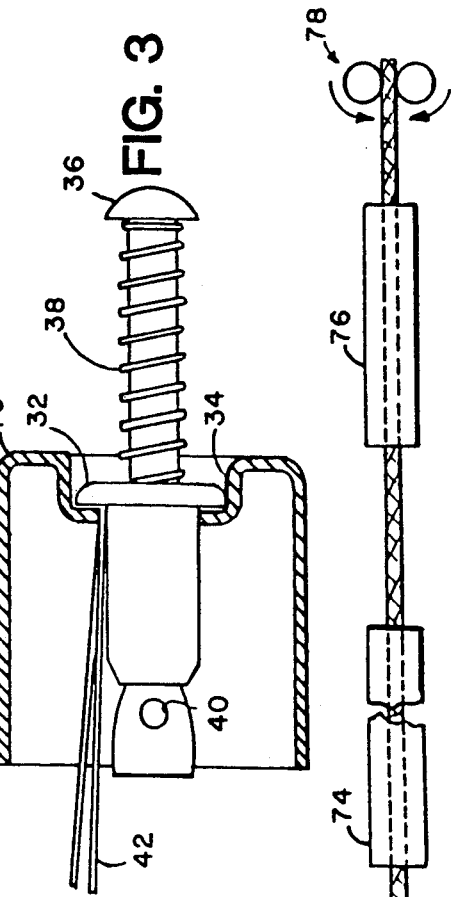
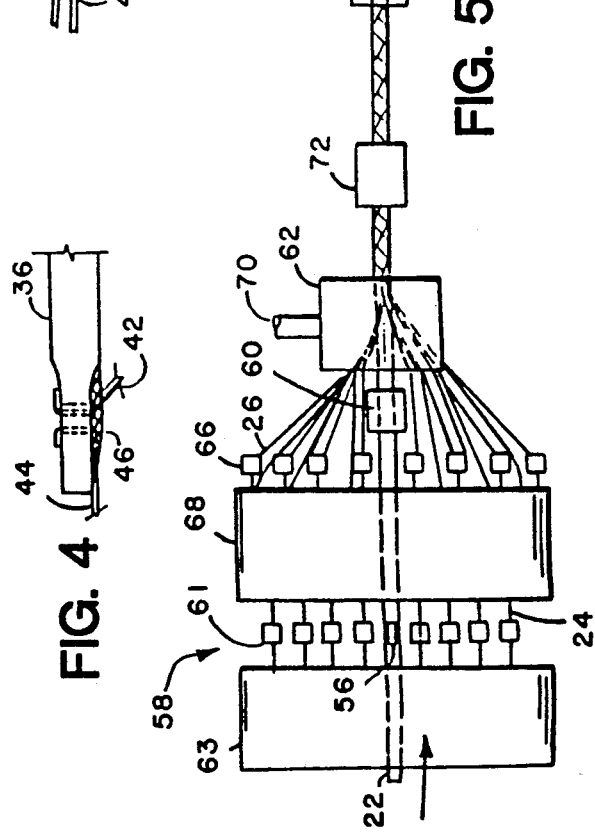

METHOD OF MANUFACTURE OF ARTICLES EMPLOYING TUBULAR BRAIDS AND RESIN APPLICATOR USED THEREIN

This application is a continuation-in-part of U.S. Ser. No. 07/413,453 filed Sep. 27, 1989, now Pat. No. 4,947,149.

BACKGROUND OF THE INVENTION

The invention relates to making tubular fuse casings and other articles employing tubular braids.

Electrical fuses are used to conduct current under normal conditions and to break a circuit under overload conditions by the melting of fusible elements of the fuses. In some fuses, tubular fuse casings are used to contain the fusible elements. The ends of the fuse casings are sealed shut by crimped ferrules to which the fusible elements are electrically connected. The fuse casings must be resistant to the axial and radial mechanical stresses and to thermal stresses experienced during blowing of the fuse. The fuse casings must also exhibit dimensional stability so as to maintain good contact with the crimped ferrules during use. The casing should ideally be a good thermal insulator in order to contain the heat and provide for quick melting of the fusible elements under overload conditions.

Healey, Jr., U.S. Pat. Nos. 3,979,709; 3,983,525; and 3,984,800 disclose fuses employing fuse casings made by wrapping a plurality of fabric and fiber mat plies on stationary tubular mandrels that have holes for injecting and impregnating resin into the plies. Kozacka U.S. Pat. No. 3,240,905 and Wilks U.S. Pat. No. 4,124,836 disclose fuses having fuse casings with outer tubes and asbestos liners inside.

SUMMARY OF THE INVENTION

In one aspect, the invention features, in general, an electrical fuse that includes a fuse casing with a preformed inner structural tube and an outer layer that has been formed in place thereon.

In preferred embodiments, the outer layer includes reinforcing fibers around the inner tube and resin bonding the fibers together; the reinforcing fibers are multiple-filament reinforcing yarns that have been braided in a tubular shape on the inner tube, and the resin impregnates the yarns. The preformed inner tube provides thermal barrier properties, and in addition can be used to provide bulk to the inner tube inexpensively without the need for additional layers of reinforcing fiber. The inner tube is made of paper that is an electrical insulation grade of vulcanized fiber (sometimes referred to as fish paper). The braided yarns include longitudinally oriented warp yarns and laterally oriented fill yarns. The resin is a thermoset resin preferably made of polyester, phenolic, epoxy or melamine. The casing has a circular or a square cross section. The yarns preferably are fiberglass; depending on the application, other material such as Kevlar or graphite can be used. The fill yarns are more than 4 times larger than the warp yarns (most preferably 8 to 10 times larger than the warp yarns), and there are twice as many fill yarns as warp yarns.

In another aspect, the invention features, in general, a method of making an electrical fuse by providing a preformed inner tube, forming an outer layer thereon (most preferably by braiding on the tube), placing a fusible element inside the inner tube, and electrically connecting ferrules to the fusible elements and securing the ferrules to the respective ends of the casing.

In another aspect, the invention features, in general, an electrical fuse that includes a fuse casing having a tubular wall that includes multiple-filament reinforcing yarns that have been braided in the tubular shape of the wall and a synthetic resin that bonds the yarns together and impregnates the yarns.

In another aspect, the invention features, in general, making a resin-impregnated tubular product (e.g., an electrical fuse casing) by applying resin to fibers as they travel from spools of a braiding machine to a mandrel (e.g., an inner tube on which the fibers are braided) on which they converge together in a tubular braid. The resin is applied by an applicator that has a wiping surface that is defined by a surface of revolution that surrounds the mandrel. The wiping surface has an orifice means that has annular orifice portions at substantially all angular positions around the axis of the mandrel to supply a layer of resin on the wiping surface continuously around the axis. Resin is uniformly and continuously applied around the fibers and along their lengths as the fibers pass over the wiping surface, traveling both axially and transversely to converge on the mandrel. The annular shape of the orifice portions in the wiping surface acts to reduce the likelihood of clogs.

In preferred embodiments, there is a substantially continuous orifice in the wiping surface around the mandrel. The resin applicator has an inner piece with a passage through it for receiving the mandrel and an outer piece that is concentric and around the inner piece, and the orifice has an inner boundary defined by the inner piece outside diameter and an outer boundary defined by the outer piece inside diameter; the two-piece construction provides for ease of manufacture, disassembly, and cleaning. There is a resin flow channel that is between facing surfaces of the inner and outer pieces and leads to the orifice, the facing surfaces being defined by surfaces of revolution around the mandrel axis. There is an annular distribution channel that communicates with the resin flow channel and has a larger projected area in a radial plane than the resin flow channel so as to distribute the resin circumferentially around the distribution channel at substantially uniform pressure and to cause the material to flow through the resin flow channel at a controlled pressure drop. The inner and outer pieces are removably connected to a radially oriented plate. The distribution channel is partially defined by an annular recess in an outer surface of the inner piece, and the outer piece has a plurality of inlet passages that pass through the outer piece to the distribution channel and are circumferentially spaced around the distribution channel. The wiping surface is curved and convex in shape in axial section and has the same radius of curvature on both sides of the orifice, permitting operation at varying fiber angles, caused, e.g., by changes in line speed.

The applicator is advantageously used with a braiding machine to make fuse casings having an inner tube (which acts as the mandrel) and an outer layer made of fibers (most preferably multiple-filament yarns) that have been coated with resin by the applicator and braided in a tubular shape on the inner tube.

Other features and advantages of the invention will be apparent from the following description of the preferred embodiment thereof and from the claims.

DESCRIPTION OF PREFERRED EMBODIMENTS

The preferred embodiments will now be described.

DRAWINGS

FIG. 1 is an elevation, partially broken away, of an electrical fuse according to the invention.

FIG. 2 is a vertical sectional view, taken at 2—2 of FIG. 1, showing the fuse casing wall of the FIG. 1 electrical fuse.

FIG. 3 is a vertical sectional view showing a ferrule end cap and associated components thereof.

FIG. 4 is a partial plan view of some components of a fusible element assembly of the FIG. 1 electrical fuse.

FIG. 5 is a diagram showing a manufacturing process for making the fuse casing of the FIG. 1 electrical fuse.

STRUCTURE, MANUFACTURE AND OPERATION

Figure 7:
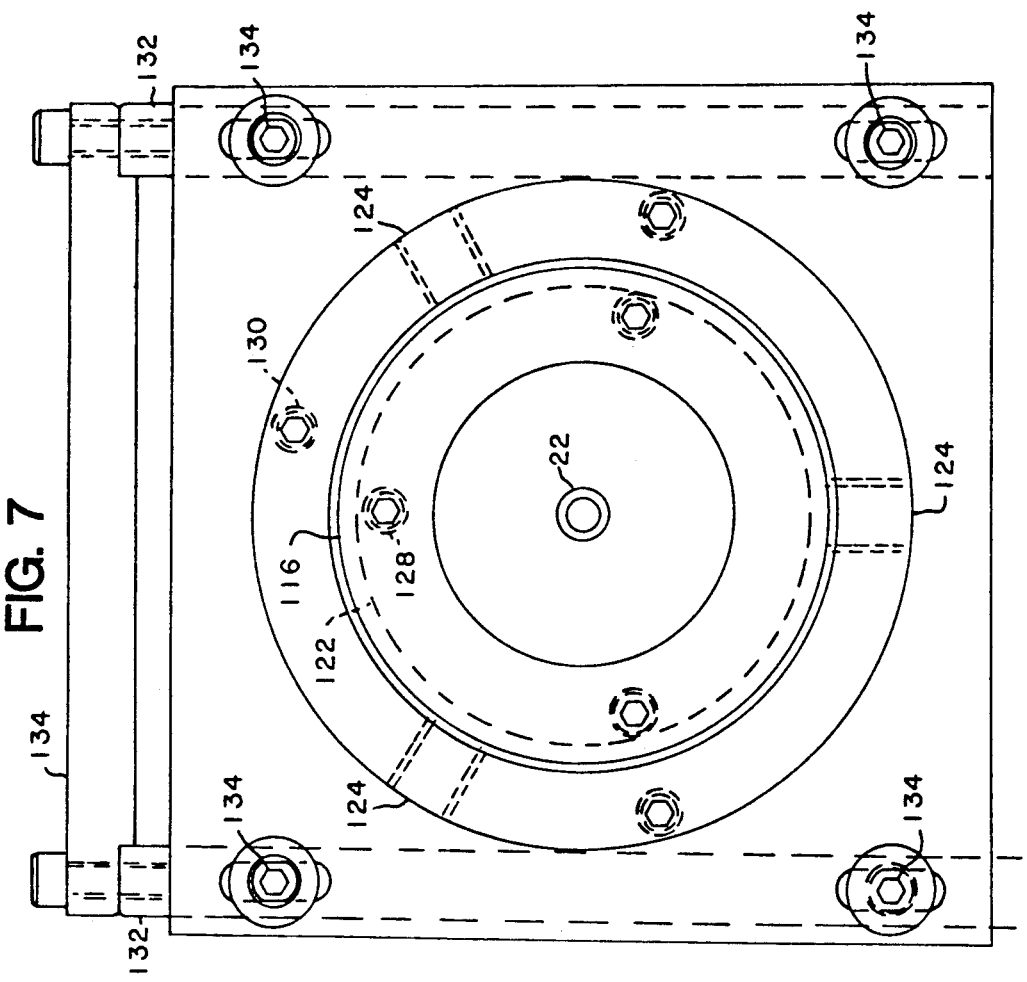
FIG. 7 is a side elevation of the FIG. 6 resin applicator partially broken away.

Referring to FIGS. 1–4, there is shown electrical fuse 10 including tubular fuse casing 12, ferrules 14 and 16 and a fusible element assembly 18. Fuse casing 12 has outer layer 20 and a preformed inner structural paper tube 22. Outer layer 20 has a tubular wall structure including multiple-filament reinforcing yarns that have been braided in a tubular shape on inner tube 22 and a polyester resin 23 that bonds the yarns together and impregnates the yarns. The yarns of outer layer 20 include sixteen longitudinally oriented, fiberglass warp yarns 24 (available under the ECG 75 1/0-0.7 TPI designation from Owens Corning) and thirty-two fiberglass fill yarns 26 (available under the ECG 37 1/0-0.7 TPI 4 ends designation from Owens Corning). Inner tube 22 is made of spiral wound fish paper and is electrical grade paper according to ASTM Spec No. D 710. It is a 105° C (Class A) material (see ASTM spec. no. D 710 X1.8.1). The polyester resin has a deformation temperature of 113° C. and a viscosity between 1100 and 1400 cps. Fuse 10 is a ⅜" size fuse, and fuse casing 12 has an inner diameter of 0.250", an outer diameter of 0.370", an inner tube 22 thickness of 0.030", and an outer layer 20 thickness of 0.030". Inner ends 28 and 30 of ferrules 14 and 16 are crimped onto the outer surface of fuse casing 22.

Fusible element assembly 18 includes seat 32 (FIG. 3), which sits in recess 34 of ferrule 16 and carries plunger 36. One end of plunger 36 is biased outward by spring 38, and the other end of plunger 36 has hole 40 in which an end of wire 42 and an end of wire 44 are secured by solder 46 (FIG. 4). The other end of wire 42 is soldered between seat 32 and ferrule 16 (solder not shown in FIG. 1), and the other end of wire 44 is held in solder 47 in trough 48. Electrical wire 50 extends from the other end of trough 48 and passes through slot 52 in slug 54 and is soldered thereto (solder not shown in FIG. 1).

Referring to FIG. 5, in the manufacture of fuse casing 12, six-foot lengths of inner paper tube 22 are spliced together by internal wooden pegs 56 and fed through braiding apparatus 58 to tube guide 60, which properly aligns the tube in the center of resin applicator 62. Resin applicator 62 applies resin to yarns 24 and 26 as they travel from braiding machine 58 to the outer surface of tube 22 just prior to the yarns being braided onto tube 22 just downstream of resin applicator 62. Braiding machine 58 is a standard textile braider (e.g., as described in U.S. Pat. No. 3,007,497) that provides sixteen warp yarns 24 from stationary spools 61 on warp yarn stage 63 and thirty-two fill yarns 26 from moving spools 66 on fill yarn stage 68. Warp yarns 24 pass from spools 61 through the center of the fill yarn stage 68. Spools 66 for fill yarns 26 travel in circumferential undulating paths of two tracks of fill yarn stage 68 at 25 rpm. As warp yarns 24 and fill yarns 26 pass through resin applicator 62, they rub along an inner cylindrical surface to which a continuous ring of polyester resin is provided by pumping into inlet 70. The yarns passing through resin applicator 62 are impregnated and coated with more resin than is needed in the outer layer 20 of the final product in order to avoid voids.

Figure 6:
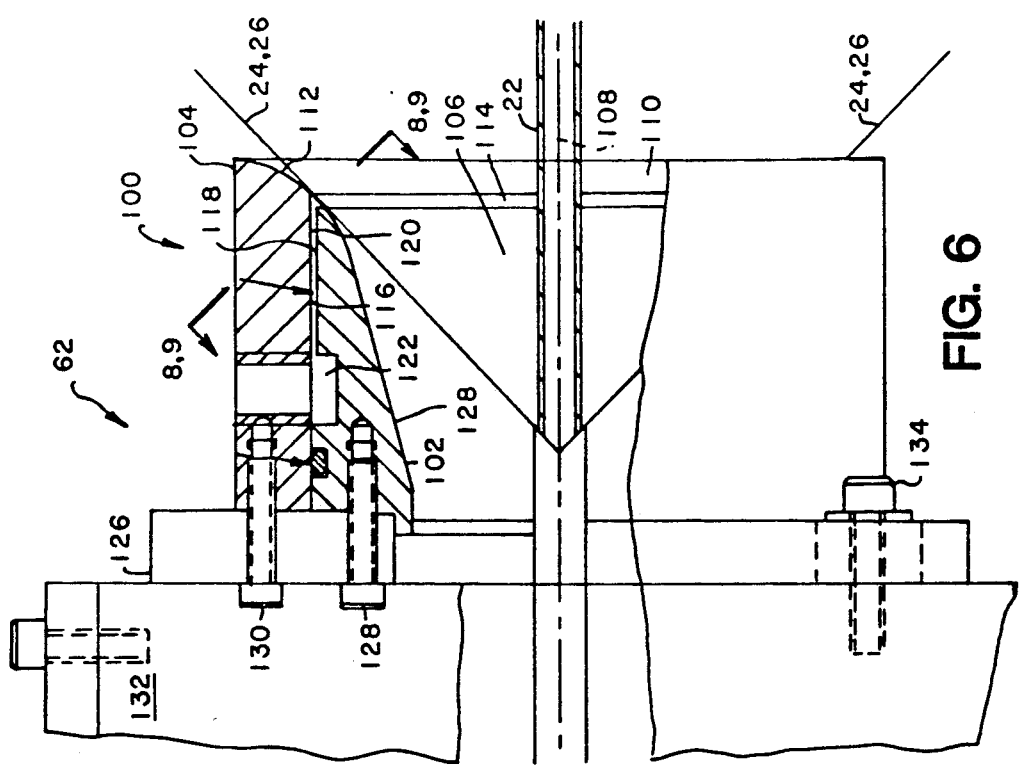
FIG. 6 is a partial elevation, partially broken away with the broken away portions rotated in FIG. 6 to show the structure of an inlet passage and connecting bolts, of a resin applicator used in the manufacturing process for making the FIG. 1 electrical fuse casing.

Referring to FIGS. 6–10, it is seen that resin applicator 62 has a body 100 made of inner piece 102 and outer piece 104. Body 100 has passage 106 through it along axis 108 along which inner tube 22 travels. Body 100 has an entrance 110 to passage 106 that is defined by wiping surface 112 on which yarns 24, 26 wipe as they pass into passage 106. Only yarns 24, 26 at the top and bottom positions are shown in FIG. 6, and these yarns are not shown in FIG. 7. Wiping surface 112 is defined by a surface of revolution around axis 108 and is curved and convex in shape in axial section. Wiping surface 112 has a radius of curvature of 1" that has an origin about ¼" above the outer surface of outer piece 104 and extends on both sides of continuous orifice 114 on pieces 102 and 104. The inner surface 128 of inner piece 102 makes a 15° angle with the horizontal. Wiping surface 112 has a continuous orifice 114 around axis 108 for supplying a layer of resin on wiping surface 112 continuously around wiping surface 112. Orifice 114 has annular orifice portions at substantially all angular positions around axis 108 in order to provide a continuous layer of resin. The orifice might possibly include some spokes to provide spacing or be provided in two or more sections that together provide annular orifice portions at substantially all angular positions around axis 108. Resin flow channel 116 is defined by inner surface 120 of outer piece 104 and outer surface 118 of inner piece 102. Resin flow channel 116 is 0.018" in radial dimension and 1" in axial length. The junctions of surfaces 120, 118 with wiping surface 112 are rounded at 0.030" radii. Annular distribution channel 122 is formed in the outer surface of inner piece 102 and communicates with cylindrical flow channel 116 continuously around axis 108. Distribution channel 122 is ¼" wide in an axial direction and 3/16" deep radially. Annular distribution channel 122 communicates with three inlet passages 124 (shown rotated in FIG. 6 from the true position shown in FIG. 7) that pass through outer piece 104. Inlet passages 124 are sized for ⅜" NPT fittings.

Inner piece 102 and outer piece 104 are removably attached to radially oriented plate 126 by bolts 128 and 130, respectively (the latter being shown rotated in FIG. 6 from the true position shown in FIG. 7). Plate 126 is secured at its two sides to vertical side walls 132 via bolts 134. Walls 132 are connected to each other at their tops via plate 135.

Figure 8:
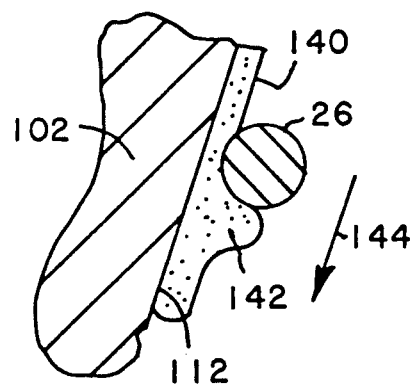
FIGS. 8 and 9 are diagrammatic, sectional views taken at 8, 9-8, 9 of FIG. 6, showing the wiping action of the fiber on a wiping surface of the FIG. 6 resin applicator.
Figure 9:
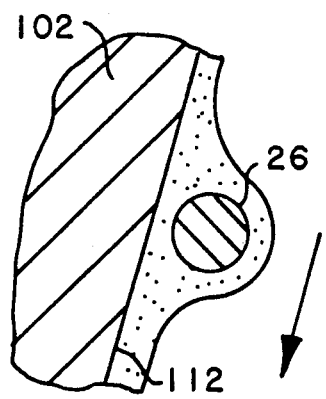
Figure 10:
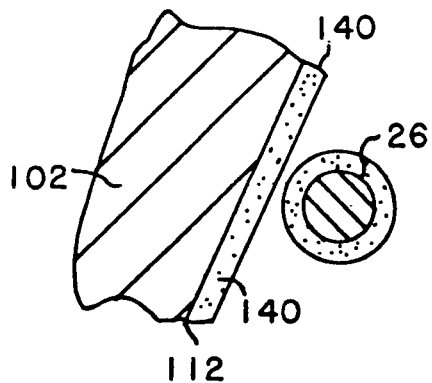
FIG. 10 is a diagrammatic, sectional view showing the FIGS. 8, 9 fiber after it has lifted from the wiping surface.

Yarns 26 travel both axially and transversely along wiping surface 112, and yarns 24 travel axially only along surface 112 in their travel from the spools of braiding machine 58 to inner tube 22, which acts a mandrel. Resin is pumped into inlet passages 124 and travels circumferentially around distribution channel 122. From channel 122, the resin travels axially through resin flow channel 116 to orifice 114, filling the space at orifice 114 and flowing onto surface 112 on both sides of orifice 114. The pressure drop in channel 116 is uniform around axis 108 and is much larger than the drop along distribution channel 122, providing substantially uniform pressure around channel 122 and substantially uniform flow through channel 116 to orifice 114. A continuous and substantially uniform layer of resin is provided continuously around wiping surface 112 so that no matter where a yarn 24 or 26 is located, it will be in contact with the resin. The resin flow is calculated to provide excess resin, which is collected in a tray under body 100. In FIG. 8, yarn 26 is shown shortly after initial contact with wiping surface 112 such that a small wave 142 of resin 140 builds up in front of yarn 26 moving in the direction of the arrow 144. With continued wiping action, resin 140 completely surrounds yarn 26, as shown in FIG. 9. After ending contact with wiping surface 112 and continuing in travel to inner tube 22, yarn 26 has a continuous coating of resin 140. Yarns 24 similarly become completely enveloped in resin even though their travel is axial. Because wiping surface 112 is curved and convex in shape in axial section, resin is applied to the yarns during operation at varying yarn angles, caused, e.g., by changes in line speed of tube 22.

Downstream of applicator 62 the yarns converge onto and form a tubular braid onto the outside of paper tube 22. The warp yarns prevent the fill yarns from tending to tighten around inner tube 22 as they are subjected to tension owing to the "Chinese fingers" effect. Because the yarns have very little twist, they essentially take the shape of whatever they lay against, and the voids between them are generally small. In any event, the yarns are impregnated, and all voids are filled with resin. The resulting tube and coated/impregnated polyester/fiberglass yarn braid structure then passes through chrome plated wiper bushing 72, which wipes off excess resin before the structure passes into heated die 74 (heated between 300° and 350° F.). The inner diameter of heated die 74 is slightly more than the outer diameter of inner tube 22 plus twice the thickness of yarn 26; the inner diameter of wiper bushing 72 is 0.010" larger than the inner diameter of the heating die 74. The polyester resin, which is a thermoset, hardens in passing through heated die 74, shrinking slightly in size (up to a few thousandths of an inch). The resulting composite tube passes from heated die 74 through fan 76 and to tractor wheels 78, which are used to advance the entire inner tube and outer layer being formed thereon through the apparatus at 1.5 fpm. In the manufacture of casing 22, by avoiding the relative travel of the braided material over a mandrel, there is less friction and damage to the yarns than there would be if a stationary mandrel were used. The resulting fuse casing 12 is sufficiently resilient so as to deform without damage when it is constricted by crimping of ferrules 14 and 16.

In addition to the spring-type fuse shown in FIGS. 1-4, the composite tube fuse casings according to the invention can be used in the types of fuses described in Knapp, Jr. et al. U.S. Pat. No. 4,344,058 and Belcher U.S. Pat. No. 3,701,069, which patents are hereby incorporated by reference. A fuse casing for a ½" size fuse of the type shown in the U.S. Pat. No. 4,344,058 has an inner diameter of 0.375"; an outer diameter of 0.500"; an inner tube 22 thickness of 0.030", and an outer layer 20 thickness of 0.032". A fuse casing for a ¾" size fuse of the type described in the U.S. Pat. No. 3,701,069 has an inner diameter of 0.625", an outer diameter of 0.750", an inner tube 22 thickness of 0.030"; and an outer layer 20 thickness of 0.032".

In the resulting electrical fuse 10, the use of the paper tube 22 provides needed bulk to the casing at low cost and also provides good heat retention properties, causing the fusible element to fuse quickly (owing to the retention of heat). Moreover, the better heat retention of the fuse casing provided by the inner paper tube permits the use of a fusible element that provides better electrical conductivity and thus less watts loss during normal operation. The heat retention properties of the inner paper tube are predictable, permitting accurate predictions of the times at which the fuses blow and reliable ratings for the fuses. The location of the paper tube inside of the outer layer acts to insulate the resin of the outer layer 20 from heat that might otherwise deleteriously affect the resin, particularly during arcing of the fuse element.

The use of a paper inner tube also permits one to increase the thickness of the composite fuse casing without increasing the thickness of the braided layer, which would require the use of thicker yarns as the thickness of the braided layer is, in general, equal to twice the thickness of the yarn. Increasing the thickness of the yarns would in turn tend to complicate the processing, as thicker yarns are more difficult to braid, and to increase cost.

The braided yarn and resin of outer layer 20 provide hoop strength and axial strength, resisting radial and axial forces during blowing of the fuse. Inner layer 22 also acts to contain gases during blowing of a fuse, something which is particularly important in applications where the fuse is contained in an enclosure which would otherwise contain the gases and permit a conductive path outside of the fuse casing between the ferrules.

OTHER EMBODIMENTS

Other embodiments of the invention are within the scope of the following claims. In addition to braiding, other methods of uniformly providing reinforcing yarns around a preformed inner tube can be employed, e.g., filament winding or continuous winding in which heads move and wrap around the tube. In addition to the fiberglass yarns, Kevlar or graphite yarns can be used. In addition to the polyester resin, an epoxy resin, melamine resin, or phenolic resin can be used to impregnate and coat the yarns. Where desired, one or more additional layers can be added to the composite tube; e.g., an additional layer of yarns and resin can be braided over the first. If one were to overbraid a second layer on top of layer 20, it would permit adjusting the angles at which the fill yarns lay down; for example, the first layer could be at 45°, and the second layer could be at 30° in order to vary the strength provided by each layer, one layer providing more hoop strength and the other layer providing a greater longitudinal strength if so desired.

In addition to the fish paper tube, the tube could also be of kraft paper or paper loaded with melamine or other resins. When melamine material is in the inner tube, its liberation of nitrogen when exposed to heat desirably provides arc extinction properties.

In addition to the circular section for the fuse casing 12, rectangular cross sections or other cross sections of other shapes can also be used. Inner tube 22 could also be formed in place just prior to passing through the braiding apparatus, or it coukd be made or extruded plastic.

What is claimed is:

1. An applicator for applying resin to fibers being braided in a tubular shape, said applicator comprising
   a body having a passage along an axis therethrough for travel of said fibers being braided in a tubular shape,
   said passage having an entrance surrounding said axis,
   said entrance being defined by a wiping surface on which said fibers wipe as they pass into said passage, said wiping surface being defined by a surface of revolution around said axis,
   said passage being open so as to not have contact of said body with said fibers upstream of or downstream of said wiping surface,
   said wiping surface having an orifice means that has annular orifice portions at substantially all angular positions around said axis to supply a layer of resin on said wiping surface continuously around said axis,
   said wiping surface being convex in shape in axial section so as to permit said fibers to contact only said wiping surface in travel through said applicator and to travel as individual fibers coated with resin without contact from the wiping surface in the open passage prior to being braided with other fibers.

2. The applicator of claim 1 wherein said orifice means includes a substantially continuous orifice that surrounds said axis.

3. The applicator of claim 2 wherein said body has an inner piece having said passage therethrough and an outer piece around said inner piece, said substantially continuous orifice having an inner boundary defined by said inner piece and an outer boundary defined by said outer piece.

4. The applicator of claim 3 wherein there is a resin flow channel that is between facing surfaces of said inner and outer pieces and leads to said substantially continuous orifice, said facing surfaces being defined by surfaces of revolution around said axis.

5. The applicator of claim 4 wherein said facing surfaces of said resin flow channel have constant radii.

6. The applicator of claim 4 wherein there is an annular resin distribution channel that communicates with said resin flow channel around said axis, said distribution channel having a larger projected area in a radial plane than said resin flow channel so as to distribute said resin circumferentially around said distribution channel at substantially uniform pressure therearound and to cause said resin to flow axially through said cylindrical flow channel at a controlled pressure drop.

7. The applicator of claim 6 wherein said inner and outer pieces are removably connected to a radially oriented plate.

8. The applicator of claim 7 wherein said distribution channel is partially defined by an annular recess in an outer surface of said inner piece.

9. The applicator of claim 6 wherein said outer piece has an inlet passage passing through it to said distribution channel.

10. The applicator of claim 6 wherein said outer piece has a plurality of inlet passages that pass through said outer piece to said distribution channel and are circumferentially and substantially equally spaced around said distribution channel.

11. The applicator of claim 3 wherein said inner and outer pieces are removably connected to each other.

12. The applicator of claim 11 wherein said inner and outer pieces are removably connected to each other via connections to a radially oriented plate.

13. The applicator of claim 3 wherein said wiping surface is curved and convex in shape in axial section and has the same radius of curvature on both sides of said substantially continuous orifice.

14. The applicator of claim 1 wherein said wiping surface is convex in shape in axial section.

15. Apparatus for making resin-impregnated tubular braided products,
    a braiding machine carrying spools of fiber to be braided around a mandrel, and
    a resin applicator for applying resin to said fibers as they travel from said spools to said mandrel, said applicator comprising
    a body having a passage along an axis therethrough for travel of said fibers being braided in a tubular shape,
    said body having an entrance to said passage surrounding said axis,
    said entrance being defined by a wiping surface on which said fibers wipe as they pass into said passage, said wiping surface being defined by a surface of revolution around said axis,
    said passage being open so as to not have contact of said body with said fibers upstream of or downstream of said wiping surface,
    said wiping surface having an orifice means that has annular orifice portions at substantially all angular positions around said axis to supply a layer of resin on said wiping surface continuously around said axis,
    said wiping surface being convex in shape in axial section so as to permit said fibers to contact only said wiping surface in travel through said applicator and to travel as individual fibers coated with resin without contact from the wiping surface in the open passage prior to being braided with other fibers.

16. The apparatus of claim 15 wherein said orifice means includes a substantially continuous orifice that surrounds said axis.

17. The apparatus of claim 16 wherein said body has an inner piece having said passage therethrough and an outer piece around said inner piece, said substantially continuous orifice having an inner boundary defined by said inner piece and an outer boundary defined by said outer piece.

18. The apparatus of claim 17 wherein there is a resin flow channel that is between facing surfaces of said inner and outer pieces and leads to said substantially continuous orifice, said facing surfaces being defined by surfaces of revolution around said axis.

19. The apparatus of claim 18 wherein there is an annular resin distribution channel that communicates with said resin flow channel around said axis, said distribution channel having a larger projected area in a radial plane than said resin flow channel so as to distribute said resin circumferentially around said distribution channel at substantially uniform pressure therearound and to cause said resin to flow axially through said cylindrical flow channel at a controlled pressure drop.

20. The apparatus of claim 17 wherein said wiping surface is curved and convex in shape in axial section and has the same radius of curvature on both sides of said substantially continuous orifice.

* * * * *

UNITED STATES PATENT AND TRADEMARK OFFICE
CERTIFICATE OF CORRECTION

PATENT NO.   : 5,127,307

DATED        : July 7, 1992

INVENTOR(S)  : Robert M. Pimpis

It is certified that error appears in the above-identified patent and that said Letters Patent is hereby corrected as shown below:

ON THE TITLE PAGE:

The following reference should be included under the "References Cited" col:

U.S. Patent No. 4,344,808    08/1982    Healey Jr. et al.

Col. 4, line 56, "120, 118" should be "118, 120".
Col. 7, line 12, "coukd" should be "could".
Col. 7, line 12, "or" should be "of".

Signed and Sealed this

Twelfth Day of October, 1993

Attest:

BRUCE LEHMAN

Attesting Officer

Commissioner of Patents and Trademarks